United States Patent

(12) United States Patent
Ishihara (10) Patent No.: US 7,143,612 B2
(45) Date of Patent: Dec. 5, 2006

(54) METHOD OF MANUFACTURING GLASS PARTICULATE SEDIMENTARY BODY, AND METHOD OF MANUFACTURING GLASS BASE MATERIAL

(75) Inventor: Tomohiro Ishihara, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 134 days.

(21) Appl. No.: 10/475,836

(22) PCT Filed: Jan. 24, 2003

(86) PCT No.: PCT/JP03/00628

§ 371 (c)(1),
(2), (4) Date: Oct. 24, 2003

(87) PCT Pub. No.: WO03/062159

PCT Pub. Date: Jul. 31, 2003

(65) Prior Publication Data

US 2004/0134236 A1    Jul. 15, 2004

(30) Foreign Application Priority Data

Jan. 24, 2002  (JP) ............................. 2002-015742
Jan. 29, 2002  (JP) ............................. 2002-020263
Mar. 28, 2002  (JP) ............................. 2002-091824

(51) Int. Cl.
*C03B 37/018* (2006.01)
*C03B 37/012* (2006.01)
*C03B 37/07* (2006.01)

(52) U.S. Cl. ............................ 65/421; 65/377; 65/379; 65/424

(58) Field of Classification Search ................... 65/144, 65/377, 382, 413–416, 421, 422, 424, 484, 65/531, 532, 379, 489, 427; 385/123–128; 427/163.2

See application file for complete search history.

(56) References Cited

U.S. PATENT DOCUMENTS 4,414,008 A * 11/1983 Edahiro et al. ................ 65/384
4,421,540 A * 12/1983 Nakahara et al. ............. 65/379
4,666,487 A *  5/1987 Gerault ......................... 65/530
4,707,173 A    11/1987 Kawazoe et al.
5,116,400 A     5/1992 Abbott et al.
5,356,449 A * 10/1994 Kuwahara et al. ............ 65/421
5,639,290 A *  6/1997 Habasaki et al. ............. 65/377
6,789,401 B1 *  9/2004 Dabby et al. ................. 65/483

(Continued)

FOREIGN PATENT DOCUMENTS

JP          56-88838         7/1981

(Continued)

OTHER PUBLICATIONS

Viscosity of Gases, CRC Handbook of Chemistry and Physics, 85$^{th}$ edition, Section 6, Fluid Properties.*

*Primary Examiner*—Eric Hug
(74) *Attorney, Agent, or Firm*—McDermott Will & Emery LLP (57) ABSTRACT

To provide a method for producing a glass particle deposit and a method for producing a glass preform, in which outer diameter variation of the glass particle deposit can be reduced to thereby improve quality. A flow rate of clean gas (CG) introduced into a container potion 10 is limited to thereby prevent the outermost layer of a glass particle deposit 20 from being locally cooled and reduce variation in bulk density in the longitudinal direction of the glass particle deposit 20, that is, outer diameter variation and breakage.

14 Claims, 4 Drawing Sheets

U.S. PATENT DOCUMENTS

2001/0037662 A1   11/2001   Kohmura et al.

FOREIGN PATENT DOCUMENTS

| JP | 57-35134 | 7/1982 |
| JP | 59-3033 | 1/1984 |
| JP | 60-90844 | 5/1985 |
| JP | 63-242938 | 10/1988 |
| JP | 10-72231 | 3/1998 |
| JP | 11-349345 | 12/1999 |
| JP | 2000-109334 A | 4/2000 |
| JP | 2000-128565 A | 5/2000 |
| JP | 2000-319024 A | 11/2000 |

\* cited by examiner

METHOD OF MANUFACTURING GLASS PARTICULATE SEDIMENTARY BODY, AND METHOD OF MANUFACTURING GLASS BASE MATERIAL

TECHNICAL FIELD

The present invention relates to a method for producing a glass particle deposit and a method for producing a glass preform.

BACKGROUND ART

As a method for producing a glass particle deposit, there is known a method (multilayer deposition method) of depositing glass particles on an outside of a starting rod stratiformly to obtain a glass particle deposit as disclosed in U.S. Pat. No. 5,116,400.

According to the method for producing a glass particle deposit, a starting position of traverse is moved to a predetermined position for every traverse movement and, after the starting position of traverse reaches a predetermined position, the position is moved reversely back to the initial traverse starting position. As a result, variation in an end portion of traverse in which the time required for soot deposition is substantially long or variation of a degree of touching of a burner flame against the glass particle deposit, or the like is distributed into the whole glass particle deposit. The time and atmosphere substantially required for depositing glass particles are averaged evenly throughout the glass particle deposit. In this manner, the amount of deposited glass particles is made uniform in the longitudinal direction to thereby reduce outer diameter variation. Moreover, when glass particles are deposited while the starting position of traverse is moved, clean air is supplied to the whole glass particle deposit perpendicularly to the longitudinal direction so that the deposition temperature gradient in the longitudinal direction of the glass particle deposit is reduced.

Incidentally, in the production of the glass particle deposit, a surface of the glass particle deposit is cooled by a flow of clean gas (CG) introduced into a glass particle deposit producing apparatus or by surplus air or the like entered in through a gap formed around a support rod or the like. It has been found that bulk density consequently varies in the longitudinal direction of the glass particle deposit to cause outer diameter variation. That is, the amount of deposited glass particles increases in a portion of low bulk density having a large diameter and, conversely, the amount of deposited glass particles decreases in a portion of high bulk density having a small diameter because of variation in bulk density in the longitudinal direction. For this reason, the thickness of glass in a glass preform finally obtained also varies in the longitudinal direction to cause deterioration of quality.

DISCLOSURE OF THE INVENTION

An object of the invention is to provide a method for producing a glass particle deposit and a method for producing a glass preform, in which outer diameter variation of the glass particle deposit can be reduced to thereby improve quality. Another object of the invention is to reduce an abnormal point of a glass preform or an optical fiber from being caused by contamination of a glass particle deposit with impurities or to reduce the glass particle deposit from being broken.

The method of producing a glass particle deposit according to the invention is a method of producing a glass particle deposit in a container portion containing a starting rod and provided with an exhaust port by forming flame from a burner for synthesizing glass particles to thereby generate the glass particles while reciprocally moving and rotating the starting rod to thereby deposit the glass particles on an outer circumference of the starting rod, wherein a flow rate of clean gas introduced into the container portion is a flow rate selected to be not higher than four times as much as the volume of the apparatus per minute.

Preferably, in the method of producing a glass particle deposit according to the invention, the clean gas is introduced from an upper portion and/or a lower portion to the exhaust port so that the internal pressure gradient of the container portion from a clean gas introducing portion to the exhaust port is selected to be in a range of from 5 Pa/m to 150 Pa/m.

The method of producing a glass particle deposit according to the invention is a method of producing a glass particle deposit by forming flame from a burner for synthesizing glass particles in a container portion containing a starting rod and provided with an exhaust port to thereby generate the glass particles and deposit the glass particles on an outer circumference of the starting rod while relatively reciprocally moving and rotating the starting rod and the burner, wherein clean gas is introduced from an upper portion and/or a lower portion to the exhaust port so that the internal pressure gradient of the container portion from a clean gas introducing portion to the exhaust port is selected to be in a range of from 5 Pa/m to 150 Pa/m.

Desirably, in the method of producing a glass particle deposit according to the invention, the clean gas is introduced from an upper portion and/or a lower portion to the exhaust port so that the pressure at a clean gas introducing portion is higher than the external pressure of the container portion by a pressure difference of from zero to 100 Pa.

Preferably, in the method of producing a glass particle deposit according to the invention, the clean gas has such cleanliness that the number of dust particles with a size not smaller than 0.3 μm is not larger than 1000/CF (cubic feet).

Preferably, in the method of producing a glass particle deposit according to the invention, the internal pressure of an exhaust pipe communicating with the exhaust port is lower than the external pressure of the apparatus by a pressure difference of from zero to 29 Pa.

Preferably, the method of producing a glass preform according to the invention is a method of producing a glass preform by heating a glass particle deposit to thereby vitrify the glass particle deposit after keeping the glass particle deposit in an isolation chamber into which clean gas is introduced, wherein the time required for the keeping is selected to be not longer than 48 hours.

Preferably, in the method of producing a glass preform according to the invention, the internal pressure of the isolation chamber is higher than the external pressure of the isolation chamber. Preferably, in this case, the clean gas has such cleanliness that the number of dust particles with a size not smaller than 0.3 μm is not larger than 1000/CF.

Preferably, the method of producing a glass preform according to the invention is a method of producing a glass preform by heating a glass particle deposit to thereby vitrify the glass particle deposit after keeping the glass particle deposit in an atmosphere of clean gas, wherein the time required for the keeping is selected to be not longer than 24 hours. Preferably, in this case, the clean gas has such cleanliness that the number of dust particles with a size not smaller than 0.3 μm is not larger than 10000/CF.

Incidentally, in the drawings, the reference numeral 10A or 10B designates a container portion for containing a glass particle deposit; 11, a burner for synthesizing glass particles; 12, an exhaust pipe; 15, a clean gas introducing pipe (clean gas introducing portion); 18, a starting rod; 20, a glass particle deposit; 26, an exhaust port; and 50, an isolation chamber.

BEST MODE FOR CARRYING OUT THE INVENTION

Figure 1:
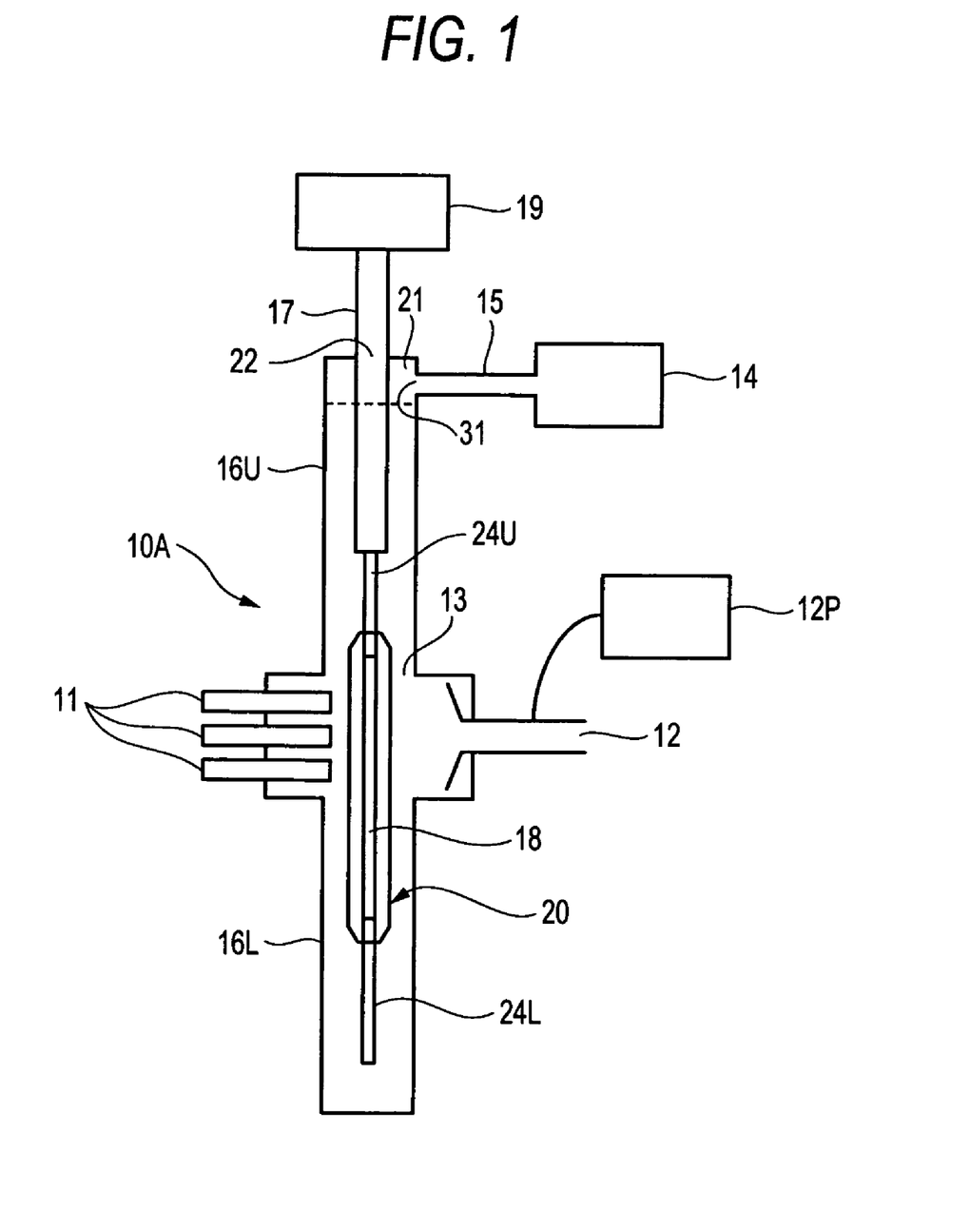
FIG. 1 is a sectional view of important part showing a first embodiment of the method for producing a glass particle deposit according to the invention.

A first embodiment of the method for producing a glass particle deposit according to the invention will be described below in detail with reference to the drawings. FIG. 1 is a schematic sectional view showing a glass particle deposit producing apparatus for carrying out the method of producing a glass particle deposit according to the invention.

As shown in FIG. 1, the glass particle deposit container portion 10A includes a reaction vessel 13, an upper extension portion 16U, and a lower extension portion 16L. A burner 11 for synthesizing glass particles and an exhaust pipe 12 are provided in the reaction vessel 13. The upper extension portion 16U is provided with a clean gas (hereinafter referred to as "CG") introducing pipe 15 for leading CG from a CG generator 14. Incidentally, the exhaust pipe 12 is provided with pressure measuring equipment 12P for measuring the internal pressure of the exhaust pipe.

In the method according to this embodiment, basically, the burner 11 for synthesizing glass particles forms flame to generate glass particles in the container portion 10A to thereby deposit the glass particles on an outer circumferential surface of the starting rod 18 supported by a support rod 17. The starting rod 18 is reciprocally moved up and down by a lift 19 while rotated. The glass particles are deposited on the outer circumference of the starting rod 18 to thereby produce a glass particle deposit 20. In this case, a flow rate of CG introduced into the container portion is selected to be not higher than four times as much as the volume of the container portion per minute. Accordingly, outer diameter variation of the glass particle deposit is reduced. Preferably, the flow rate of CG is selected to be not higher than three times as much as the volume of the container portion per minute.

Incidentally, because end portions of the glass particle deposit are apt to be cooled, variation in bulk density causes outer diameter variation or breakage easily. Because the glass particles are easily deposited on portions low in bulk density, the outer diameter variation is emphasized more greatly. In the invention, such outer diameter variation or breakage can be reduced.

The glass particle deposit container portion 10A includes the reaction vessel 13 provided with the exhaust pipe 12. CG generated in the CG generator 14 is introduced into the container 10A through the CG introducing pipe 15. The glass particle deposit is reduced from being contaminated with impurities. While floating dust in the container portion 10A is discharged from the exhaust pipe 12 to the outside of the container portion 10A, the glass particles are deposited. The internal pressure of the glass particle deposit container portion 10A (the upper extension portion 16U, the reaction vessel 13 and the lower extension portion 16L) is kept higher than the external pressure of the container portion so that a pressure difference expressed as the difference between the internal pressure of the exhaust pipe and the external pressure of the container portion is preferably selected to be not larger than 29 Pa, preferably in a range of from 5 Pa to 10 Pa. As a result, mixing of external air in the glass particle deposit container portion 10A can be prevented as much as possible. Accordingly, the glass particle deposit 20 can be prevented from being cooled by the external air mixed, so that outer diameter variation and breakage can be prevented. Incidentally, the floating dust contains glass particles, etc., not deposited on the glass particle deposit 20 in the container portion 10A.

Although description has been made of the case where the starting rod is reciprocally moved up and down, the burner may be reciprocally moved up and down. In this case, the upper extension portion and the lower extension portion can be removed so that the reaction vessel may be provided as a vertically long reaction vessel. The burner is reciprocally moved up and down in the reaction vessel. The glass particle deposit container portion is composed of only the reaction vessel (this rule is also applied to other embodiments hereinafter).

EXAMPLE 1

A glass particle deposit container portion 10A including a reaction vessel 13 made of Ni, an upper extension portion 16U, and a lower extension portion 16L as shown in FIG. 1 was used for depositing glass particles. The total internal volume of the upper extension portion 16U, the reaction vessel 13 and the lower extension portion 16L was 0.8 m$^3$. A hole 22 for inserting a support rod 17 and an input port 31 for inputting clean air (hereinafter referred to as "CA") as CG are provided in an upper cover 21 provided in the upper extension portion 16U. Three burners 11 for generating glass particles was provided in the reaction vessel 13. Dummy rods 24U and 24L made of quartz glass were fusion-bonded to opposite sides of a core rod (400 mm long) having core/cladding portions and having a diameter of 26 mm. Thus, a starting rod 18 was produced. The starting rod 18 was placed vertically while rotated at 40 rpm. The glass particles generated by the burner 11 for generating glass particles were deposited successively while the starting rod 18 was reciprocally moved up and down at a speed of 200 mm/min by a one-way distance of 1000 mm. Thus, a glass particle deposit 20 was produced.

As the burner 11 for generating glass particles, three burners with a diameter of 30 mm are provided so that the respective centers of the burners were arranged at intervals of 150 mm. Into each of the burners 11, 4 to 6 SLM (standard liters per minute) of silicon tetra-chloride as a raw material of glass particles to be deposited around the core rod portion, 60 to 100 SLM of hydrogen and 50 to 100 SLM of oxygen for forming flame, and 6 SLM of Ar gas as a sealing gas were supplied. The flow rate of the raw material and the flow rate of the oxygen/hydrogen gas were increased by 1% whenever the starting rod was turned back in the reciprocal movement. The difference between the external pressure of the container portion 10A and the internal pressure of the exhaust pipe 12 was selected to be 10 Pa. CA was introduced at a flow rate of 2 m$^3$/min through the upper extension portion 16U so that the number of dust particles with a size of not smaller than 0.3 μm was in a range of from 40/CF to 60/CF. The glass particles were deposited so that glass weight was 9 kg.

The outer diameter of the glass particle deposit 20 obtained in this manner was measured. As a result, outer diameter variation in the longitudinal direction of a portion internally including the core rod portion was 3 mm. In this example, CA was used as CG. The same effect was also obtained in the case where inert gas such as nitrogen, helium or argon was used as CG.

Incidentally, the number of dust particles was measured by a particle counter MODEL 237B made by Met One Instruments Inc.

COMPARATIVE EXAMPLE 1

Glass particles with glass weight of 9 kg were deposited in the same manner as in Example 1 except that CA was introduced at a flow rate of 10 m$^3$/min through the upper extension portion 16U so that the number of dust particles with a size of not smaller than 0.3 μm was in a range of from 40/CF to 60/CF in the condition that the difference between the external pressure of the container portion 10A and the pressure of the exhaust pipe 12 was 50 Pa.

The outer diameter of the glass particle deposit 20 obtained was measured. As a result, spiral outer diameter variation was observed. The outer diameter variation in the longitudinal direction of a portion internally including the core rod portion reached 15 mm. It was obvious that the outer diameter variation increased because the flow rate of air was selected to be not lower than four times (3.2 m$^3$) as much as the internal volume of the container portion 10A.

EXAMPLE 2

Glass particles with glass weight of 9 kg were deposited in the same manner as in Example 1 except that CA was introduced at a flow rate of 2 m$^3$/min through the upper extension portion 16U so that the number of dust particles with a size of not smaller than 0.3 μm was in a range of from 40/CF to 60/CF in the condition that the difference between the external pressure of the container portion 10A and the internal pressure of the exhaust pipe 12 was 50 Pa.

The outer diameter of the glass particle deposit 20 obtained in this manner was measured. As a result, spiral outer diameter variation was observed slightly. The outer diameter variation in the longitudinal direction of the core rod portion was 6 mm. In this example, because the difference between the external atmospheric pressure of the container portion and the internal atmospheric pressure of the exhaust pipe was selected to be 50 Pa which was larger than 29 Pa, the outer diameter variation was larger than that in Example 1. The outer diameter variation was however smaller than a half of that in Comparative Example 2 because the flow rate of clean gas supplied to the container portion was selected to be not higher than four times as much as the volume of the container portion.

EXAMPLE 3

Glass particles with glass weight of 9 kg were deposited in the same manner as in Example 1 except that CA was introduced at a flow rate of 2 m$^3$/min through the upper extension portion 16U so that the number of dust particles with a size of not smaller than 0.3 μm was 10000/CF in the condition that the difference between the external pressure of the container portion 10A and the internal pressure of the exhaust pipe 12 was 10 Pa.

The outer diameter of the glass particle deposit 20 obtained in this manner was measured. As a result, outer diameter variation in the longitudinal direction of the core rod portion was 3 mm which was small. When the glass particle deposit 20 was heated to be vitrified for forming a glass preform, a large number of voids were, however, generated in the glass preform. In this example, it was conceived that contamination of the glass particle deposit with impurities caused the generation of voids because CA supplied to the container portion had such cleanliness that the number of dust particles was larger than 1000/CF. The outer diameter variation was however small.

Figure 2:
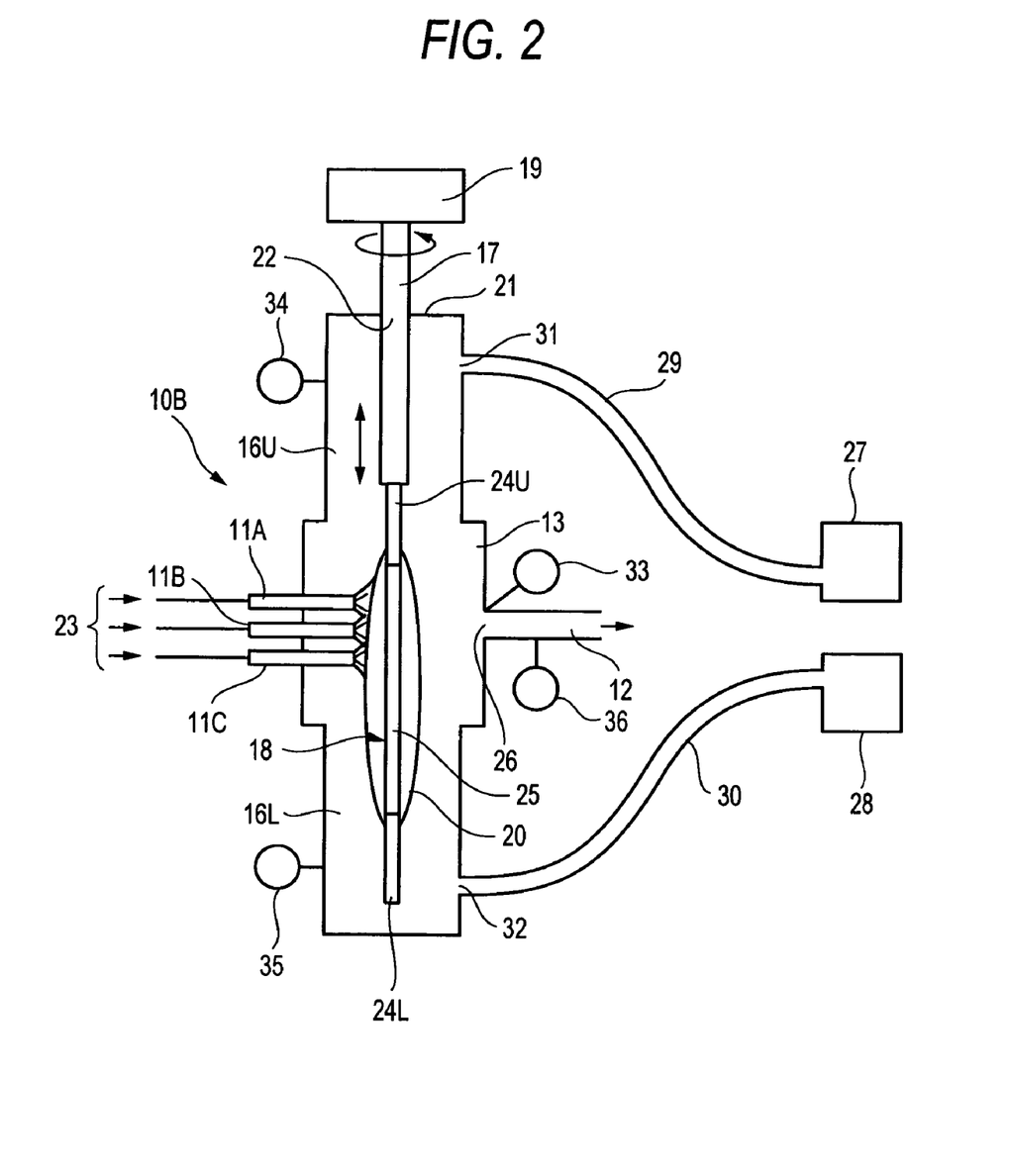
FIG. 2 is a sectional view of important part showing a second embodiment of the method for producing a glass particle deposit according to the invention.

A second embodiment of the method for producing a glass particle deposit according to the invention will be described below in detail with reference to the drawings. FIG. 2 is a schematic sectional view showing a glass particle deposit producing apparatus for carrying out the method of producing a glass particle deposit according to the embodiment. Incidentally, parts equivalent to those of the aforementioned glass particle deposit container portion 10A shown in FIG. 1 are denoted by the same reference numerals as those in FIG. 1.

As shown in FIG. 2, the glass particle deposit container portion 10B includes an upper extension portion 16U and a lower extension portion 16L which are disposed on upper and lower sides of a reaction vessel 13 so as to communicate with the reaction vessel 13. An upper cover 21 having a hole 22 for inserting a support rod 17 is disposed in an upper portion of the upper extension portion 16U. Accordingly, a starting rod 18 including dummy rods 24U and 24L connected to opposite ends of a glass rod 25 having a core or having a core and a cladding, or a preform formed by depositing the glass particle deposit 20 on the starting rod 18 can be put in and out of the reaction vessel 13.

The support rod 17 is provided so as to be able to be rotated and moved up and down by a lift 19. Three burners 11A, 11B and 11C for synthesizing glass particles are provided in the reaction vessel 13. Ends of the burners are inserted into the reaction vessel 13 through burner mount portions (holes) of the reaction vessel 13. Gas 23 is supplied to each of the burners 11A, 11B and 11C to generate glass particles in the reaction vessel 13 and deposit the glass particles on the starting rod 18 to thereby form the glass particle deposit 20.

The reaction vessel 13 is provided with an exhaust port 26. Surplus glass particles not deposited are discharged together with exhaust gas to the exhaust pipe 12. The exhaust pipe 12 communicates with exhaust means not shown. CG generated in CG generators 27 and 28 is introduced into the upper extension portion 16U and/or the lower extension portion 16L via CG introducing pipes 29 and 30, an upper CG input port 31 and a lower CG input port 32. Pressure measuring equipments 33, 34, 35 and 36 are provided for measuring the pressures of the reaction vessel 13, the upper extension portion 16U, the lower extension portion 16L and the exhaust pipe 12 respectively.

In this embodiment, when the glass particle deposit 20 is to be produced by an Outside Vapor-Phase Deposition method (OVD method), CG is first introduced into at least one of the upper extension portion 16U and the lower extension portion 16L in the container portion 10B. On this occasion, the internal pressure gradient of the container portion from the CG introducing position to the exhaust port is selected to be in a range of from 5 Pa/m to 150 Pa/m. That is, when CG is introduced into the upper extension portion 16U from the upper CG input port 31 in FIG. 2, the internal pressure of the upper extension portion 16U is measured by the pressure measuring equipment 34 and the pressure of the exhaust pipe 12 is measured by the pressure measuring equipment 36 to thereby control the internal pressure gradient of the container portion.

On the other hand, when CG is introduced into the lower extension portion 16L from the lower CG input port 32, the internal pressure of the lower extension portion 16L is measured by the pressure measuring equipment 35 and the pressure of the exhaust pipe 12 is measured by the pressure measuring equipment 36 so that the pressure gradient is selected to be in a range of from 5 Pa/m to 150 Pa/m. A point on the same level with a junction of the CG introducing pipe and the upper or lower extension portion is preferably used as the point for measuring the internal pressure of the upper or lower extension portion. More preferably, a point near the junction is used.

When CG is introduced into both the upper extension portion 16U and the lower extension portion 16L, the pressure gradient of the pressure measured by the pressure measuring equipment 34 and the pressure measured by the pressure measuring equipment 36 is selected to be in a range of from 5 Pa/m to 150 Pa/m. At the same time, the pressure gradient of the pressure measured by the pressure measuring equipment 35 and the pressure measured by the pressure measuring equipment 36 is selected to be in a range of from 5 Pa/m to 150 Pa/m. Incidentally, adjustment of the flow rate of CG maybe used as specific means for setting the pressure gradient in the range according to the invention.

In this manner, because CG is introduced into the upper extension portion 16U and/or the lower extension portion 16L so that the internal pressure gradient of the container portion 10B is selected to be in a range of from 5 Pa/m to 150 Pa/m, surplus glass particles floating in the container portion 10B can be ejected to the exhaust port 26 efficiently. The reason why the pressure gradient is selected to be in a range of from 5 Pa/m to 150 Pa/m is as follows. If the pressure gradient is smaller than 5 Pa/m, exhaust efficiency is worsened. If the pressure gradient is larger than 150 Pa/m, the flow rate inside the container portion 10B becomes high so as to cause a problem that the glass particle deposit 20 is cooled and broken.

Furthermore, in this embodiment, when the glass particle deposit is to be produced by an outside vapor-phase deposition method, CG is first introduced into either or both of the upper extension portion 16U and the lower extension portion 16L in the container portion 10B. Further, the pressure of the CG introducing portion is preferably kept higher by a value of from 0 to 100 Pa than the external pressure of the container portion 10B. As a result, external air can be prevented from being mixed through gaps (e.g., a gap between the support rod 17 and the upper extension portion 16U, a seam between the lower extension portion 16L and the reaction vessel 13, etc.) existing in the upper extension portion 16U, the lower extension portion 16L or the like, so that cleanliness in the container portion 10B can be kept high.

That is, when CG is introduced into the upper extension portion 16U in FIG. 2, the pressure measured by the pressure measuring equipment 34 provided in a position corresponding to the upper CG input port 31 is selected to be higher by a value of from 0 to 100 Pa than the pressure of external air.

When CG is introduced into the lower extension portion 16L, the pressure measured by the pressure measuring equipment 35 provided in a position corresponding to the lower CG input port 32 is selected to be higher by a value of from 0 to 100 Pa than the pressure of external air.

When CG is introduced into both the upper extension portion 16U and the lower extension portion 16L, the pressure measured by each of the pressure measuring equipments 34 and 35 is selected to be higher by a value of from 0 to 100 Pa than the pressure of external air.

Adjustment of the flow rate of CG maybe used as specific means for adjusting the pressure in the CG introducing position.

When the difference of the pressure of the CG introducing portion from the pressure of external air is smaller than 0 Pa, that is, when the pressure of the CG introducing portion is lower than the pressure of external air, external air enters the container portion 10B so that the glass particle deposit 20 is contaminated with impurities in the external air. On the other hand, if the difference is larger than 100 Pa, the glass particle deposit is cooled rapidly and broken. Accordingly, the difference is selected to be in a range of from 0 to 100 Pa.

For example, in this embodiment, clean air (CA), etc., can be used as CG. Particularly preferably, clean air, $N_2$, etc. may be used as CG. Alternatively, He, Ar, etc. may be used as CG.

In this embodiment, cleanliness of CG is preferably selected so that the number of dust particles with a size of not smaller than 0.3 μm is not larger than 1000/CF (cubic feet) in order to keep cleanliness of the container portion 10B high. This is because the number of impurities mixed in the glass particle deposit 20 increases when the number of dust particles is larger than 1000/CF.

The second embodiment of the invention will be described below in connection with specific examples but the invention is not limited to the examples.

EXAMPLE 4

The container portion 10B shown in FIG. 2 includes a reaction vessel 13 made of Ni, and an upper extension portion 16U and a lower extension portion 16L which communicate with the reaction vessel 13. CG from CG generators 27 and 28 can be introduced into the upper extension portion 16U and the lower extension portion 16L through CG introducing pipes 29 and 30. A hole 22 for inserting a support rod 17 is provided in an upper cover 21 provided in an upper portion of the upper extension portion 16U. Three burners 11A, 11B and 11C for synthesizing glass particles are provided in the reaction vessel 13.

Dummy rods 24U and 24L made of quartz glass are fusion-bonded to opposite sides of a core rod having a core and a cladding and having a diameter of 20 mm. Thus, a starting rod 18 is produced. The starting rod 18 is placed vertically while rotated at 40 rpm. The glass particles generated by the burners 11A, 11B and 11C are deposited successively on the outer circumference of the starting rod 18 while the starting rod 18 is reciprocally moved up and down at a speed of 200 mm/min by a one-way distance of 1100 mm. Thus, a glass particle deposit 20 is produced. Each of the burners 11A, 11B and 11C has a diameter of 30 mm. The burners 11A, 11B and 11C are provided so that the respective centers of the burners are arranged at intervals of 150 mm. Into each of the burners 11A, 11B and 11C, 4 SLM of $SiCl_4$ as a raw material of glass, 50 to 100 SLM of $H_2$ as a combustible gas, 60 to 100 SLM of $O_2$ as a combustion-support gas and 5 SLM of Ar as a seal gas were supplied.

CA was introduced into the upper extension portion 16U and the lower extension portion 16L from the CG introducing pipes 29 and 30 so that the number of dust particles with a size of not smaller than 0.3 μm was in a range of from 10/CF to 20/CF. Incidentally, the air in the outside of the container portion 10B had such cleanliness that the number of dust particles with a size of not smaller than 0.3 μm was 100,000/ CF.

On this occasion, the pressure gradient from the upper CG input port 31 to the exhaust port 26 was 60 Pa/m, and the pressure of the upper CG input port 31 was selected to be higher by 100 Pa than the external pressure of the container portion. The pressure gradient from the lower CG input port 32 to the exhaust port 26 was 60 Pa/m, and the pressure of the lower CG input port 32 was selected to be higher by 100 Pa than the external pressure of the container portion.

At a point of time when the weight of glass reached a target value of 10 kg, the deposition of glass particles was stopped. The glass particle deposit 20 finally obtained was heated at a high temperature so as to be vitrified. Then, the glass obtained thus was formed into a fiber by an ordinary method. On this occasion, the sum (abnormal point frequency) of the frequency of outer diameter variation of the fiber and the frequency of breakage in a screening test was 20 times per Mm. Table 1 shows conditions for this example and obtained results.

EXAMPLES 5 TO 9 AND COMPARATIVE EXAMPLES 2 TO 4

A glass particle deposit was produced and formed into a fiber by the same producing apparatus as in Example 4 in the same manner as in Example 4 except that the exhaust pressure (exhaust amount) and the amount of input clean gas were changed. That is, the pressure of the upper CG input port 31, the pressure of the lower CG input port 32, the pressure gradient from each of the input ports 31 and 32 to the exhaust port 26 and the pressure of the exhaust port were changed as shown in Table 1. The frequency (times per Mm) of outer diameter variation of the fiber, the frequency (times per Mm) of breakage in a screening test and the abnormal point frequency (times per Mm) on this occasion are also shown in Table 1.

TABLE 1

|  | Upper CG input portion pressure (Pa) | Upper extension portion-exhaust port pressure gradient (Pa/m) | Lower CG input portion pressure (Pa) | Lower extension portion-exhaust port pressure gradient (Pa/m) | Exhaust port pressure (Pa) | Abnormal point frequency, (3) = (1) + (2) (times per Mm) | Outer diameter variation frequency (times per Mm) | Breaking frequency in screening (times per Mm) |
| --- | --- | --- | --- | --- | --- | --- | --- | --- |
| Example 4 | 100 | 60 | 100 | 60 | 20 | 20 | 10 | 10 |
| Example 5 | 110 | 70 | 110 | 70 | 30 | Breaking occurred partially. | — | — |
| Comparative Example 2 | 100 | 160 | 100 | 160 | 220 | Breaking occurred on the whole length. | — | — |
| Example 6 | 90 | 60 | 90 | 60 | 30 | 22 | 10 | 22 |
| Example 7 | 0 | 5 | 0 | 5 | 10 | 60 | 25 | 35 |
| Comparative Example 3 | −5 | 1 | −5 | 1 | 7 | 100 | 40 | 60 |
| Example 8 | 5 | 10 | 5 | 10 | 15 | 50 | 29 | 30 |
| Example 9 | 250 | 150 | 250 | 150 | 50 | Breaking occurred partially. | — | — |
| Comparative Example 4 | 260 | 160 | 260 | 160 | 60 | Breaking occurred on the whole length. | — | — |

In Table 1, the CG input portion pressure is equal to the subtraction of the external pressure of the container portion from the pressure at the clean gas introducing portion of the container portion, the pressure of the exhaust port is equal to subtraction of the pressure of a neighbor of the exhaust port from the external pressure of the container portion, and CG is an abbreviation of clean gas.

As is obvious from the results shown in Table 1, it is found that the abnormal point frequency is reduced when the pressure gradient from each of the upper extension portion 16U and the lower extension portion 16L to the exhaust port 26 is in a range of from 5 Pa/m to 150 Pa/m. It is also found that there is no occurrence of breakage and the abnormal point frequency is low when the pressure of each of the CG input ports 31 and 32 is in a range of from 0 to 100 Pa.

Figure 3:
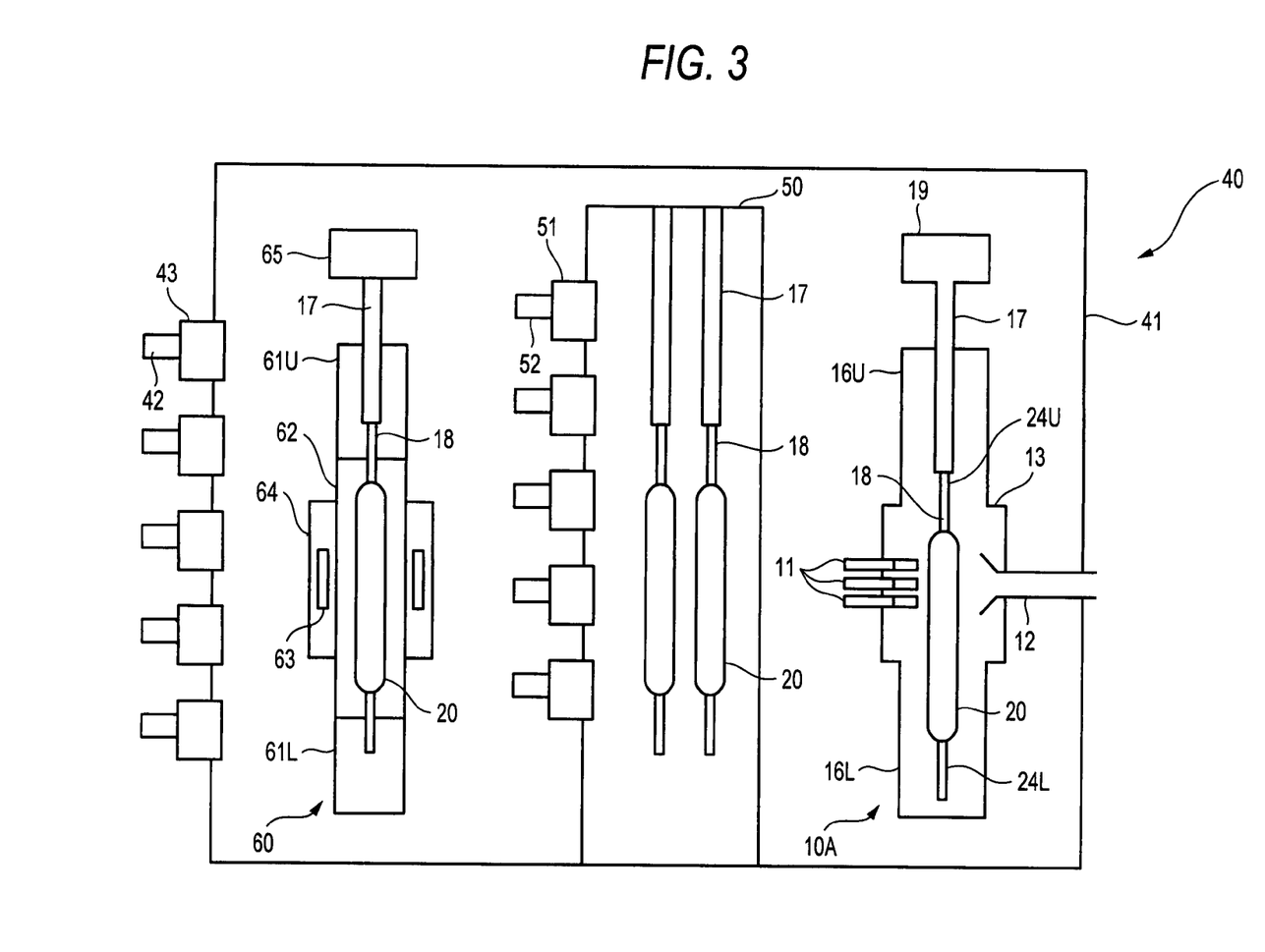
FIG. 3 is a sectional view of important part showing an embodiment of the method for producing a glass preform according to the invention.

Next, an embodiment of a method for producing a glass preform according to the invention will be described in detail with reference to the drawings. FIG. 3 is a schematic sectional view showing a glass preform producing apparatus for carrying out the method for producing a glass preform according to the invention. Incidentally, parts equivalent to those of the aforementioned glass particle deposit producing apparatus shown in FIG. 1 are denoted by the same reference numerals as those in FIG. 1.

As shown in FIG. 3, in the glass preform producing apparatus 40, a container portion 10A, a consolidator 60 and an isolation chamber 50 for keeping glass particle deposits 20 are installed in a housing 41. First, the container portion 10A which includes a reaction vessel 13, and upper and lower extension portions 16U and 16L and which is provided in the housing 41 is used for depositing glass particles. For example, dummy rods 24U and 24L made of quartz glass are fusion-bonded to opposite sides of a core rod having core/cladding portions to thereby form a starting rod 18. The starting rod 18 is placed vertically to the lift 19 through the support rod 17. Then, the starting rod 18 is relatively reciprocally moved up and down while rotated, so that glass particles generated by the burner 11 for synthesizing glass particles are deposited successively on the outer circumference of the starting rod 18. Thus, a glass particle deposit 20 is produced.

At a point of time when the weight of glass reaches a predetermined value, the deposition of glass particles is stopped. The glass particle deposit 20 is carried into the isolation chamber 50. It is preferable that the glass particle deposit 20 is carried into the isolation chamber 50 within two hours after the stop of the deposition of glass particles. Incidentally, dust-containing gas in the reaction vessel 13 is discharged from the exhaust pipe 12. Preferably, gas taken in through air-intake ports 52 is generated as CG in which the number of dust particles with a size of not smaller than 0.3 µm is in a specific range, by CG generators 51 and supplied into the isolation chamber 50 in the housing 41. More preferably, the internal pressure of the isolation chamber 50 is controlled to be higher than the internal pressure of the housing 41 (the external pressure of the isolation chamber 50). The cleanliness in the isolation chamber 50 is preferably set so that the number of dust particles with a size of not smaller than 0.3 µm is not larger than 1000/CF. For example, while the glass particle deposit 20 is kept, CA in which the number of dust particles with a size of not smaller than 0.3 µm is in a range of from tens of particles per CF to hundreds of particles per CF is introduced from the CG generators 51 into the isolation chamber 50 at a flow rate of from 10 m³/min to 50 m³/min. The number of dust particles with a size of not smaller than 0.3 µm in the atmosphere on the outside of the isolation chamber 50 is selected to be thousands of particles per CF. The number of dust particles can be measured by a particle counter.

Within 48 hours, the glass particle deposit 20 is taken out of the isolation chamber 50, carried into the consolidator 60 and heated so as to be vitrified. The consolidating temperature is generally selected to be in a range of from 1520° C. to 1570° C. In the consolidator 60, the glass particle deposit 20 is held in a furnace tube 62 having upper and lower covers 61U and 61L in the upper and lower sides while rotated by a lift 65. The glass particle deposit 20 is heated and consolidated by a furnace 64 provided with a heater 63. The cleanliness of the atmosphere on the outside of the consolidator 60 is kept at a predetermined value by air-intake ports 42 and CG generators 43 provided in the housing 41.

In the aforementioned embodiment, the isolation chamber 50 may be dispensed with so that the glass particle deposit is kept in the CG atmosphere in the condition that the keeping time is selected to be not longer than 24 hours. In this case, the number of dust particles with a size of not smaller than 0.3 µm in CG is preferably selected to be not larger than 10000/CF.

In this embodiment, impurities and water mixed in the glass particle deposit 20 or deposited on the surface of the glass particle deposit 20 can be reduced to thereby reduce abnormal points in the glass preform, and absorption of light to OH group can be reduced to thereby reduce the transmission loss of the optical fiber produced from the glass preform. That is, the quality of the glass preform can be improved.

Specific examples will be described below but there is no intention to limit the invention to the specific examples.

EXAMPLE 10

The container portion 10A, the consolidator 60 and the isolation chamber 50 for keeping the glass particle deposit 20 are installed in the housing 41. The number of dust particles with a size of not smaller than 0.3 µm in the atmosphere in the housing is selected to be 8000/CF in average. CA in which the number of dust particles with a size of not smaller than 0.3 µm is 20/CF in average is introduced into the isolation chamber 50 so that the internal pressure of the isolation chamber 50 is controlled to be higher by 50 Pa than the external pressure of the isolation chamber.

The container portion 10A including a reaction vessel 13, and upper and lower extension portions 16U and 16L is used for depositing glass particles. First, dummy rods 24U and 24L made of quarts glass are fusion-bonded to opposite sides of a core rod having core/cladding portions and having a diameter of 20 mm to thereby produce a starting rod 18. The starting rod 18 is placed vertically while rotated at 40 rpm. Glass particles generated by the burner 11 for synthesizing glass particles are deposited on the outer circumference of the starting rod 18 while the starting rod 18 is reciprocally moved up and down. Thus, the glass particle deposit 20 is produced. When the weight of glass reaches a target value of 10 kg, the deposition of glass particles is stopped. Two hours later, the glass particle deposit 20 is carried into the isolation chamber 50.

Two further hours later, the glass particle deposit 20 is taken out of the isolation chamber 50, carried into the consolidator 60 and vitrified to thereby produce a glass preform. The glass preform is drawn to obtain an optical fiber. On this occasion, the sum of the frequency of occurrence of abnormal points in the outer diameter of the optical fiber (hereinafter referred to as outer diameter variation frequency) and the frequency of breakage in a screening test is predicted to be 20 times per Mm (outer diameter variation frequency: 10 times per Mm, breakage frequency: 10 times per Mm)

EXAMPLES 11 TO 15 AND COMPARATIVE EXAMPLES 5 TO 7

The same glass preform producing apparatus 40 as in Example 10 is used. A glass particle deposit 20 is produced in the same manner as in Example 10. Table 2 shows outer diameter variation frequency and breakage frequency predicted when conditions are changed. Here, (1) is cleanliness (the number of dust particles with a particle size of not smaller than 0.3 µm per CF) in the housing, (2) is the time (hours) required for carrying the glass particle deposit into the consolidator after the production of the glass particle deposit, (3) is cleanliness (the number of dust particles with a particle size of not smaller than 0.3 µm per CF) in the isolation chamber, (4) is the pressure difference (Pa) between the inside and outside of the isolation chamber, (5) is the keeping time (hours) in the isolation chamber, (6) is predicted outer diameter variation frequency (times per Mm), and (7) is predicted breakage frequency (times per Mm).

TABLE 2

|  | (1) | (2) | (3) | (4) | (5) | (6) | (7) |
|---|---|---|---|---|---|---|---|
| Example 11 | 1000 | 4 | 20 | 50 | 2 | 5 | 5 |
| Example 12 | 9000 | 40 | 900 | 10 | 20 | 20 | 20 |
| Comparative Example 5 | 12000 | 75 | 5000 | 0 | 50 | 75 | 75 |
| Example 13 | 9000 | 60 | 900 | 10 | 30 | 30 | 30 |
| Example 14 | 9000 | 40 | 1200 | 10 | 20 | 25 | 25 |
| Comparative Example 6 | 12000 | 40 | No isolation chamber | No isolation chamber | No isolation chamber | 70 | 70 |
| Example 15 | 10000 | 48 | 1000 | 1 | 48 | 31 | 34 |
| Comparative Example 7 | 11000 | 50 | 1200 | 0 | 50 | 57 | 63 |

In each of Examples in which the isolation chamber is provided in the condition that the time required for keeping the glass particle deposit in the isolation chamber is selected to be not longer than 48 hours, the outer diameter variation frequency is 31 times per Mm when the glass preform produced in each Example is formed into an optical fiber. In Comparative Examples 5 and 7 in which the keeping time is longer than 48 hours, the outer diameter variation frequency (6) is, however, increased remarkably so as to be not lower than 57 times per Mm. In Comparative Example 6 in which no isolation chamber was provided, the outer diameter variation frequency (6) is very high to be 70 times per Mm when the glass preform is formed into an optical fiber because the keeping time after the production of the glass particle deposit is 40 hours and is longer than 24 hours.

Incidentally, the method for producing a glass particle deposit and the method for producing a glass preform according to the invention are not limited to the aforementioned embodiments and changes, modifications, etc., may be made suitably. The invention can be widely applied to an outside vapor-phase deposition method (OVD method). It is a matter of course that the invention can be applied to a Vapor-Phase Axial Deposition method or a multi-burner multi-layer deposition method which is an embodiment of the OVD method.

Figure 4:
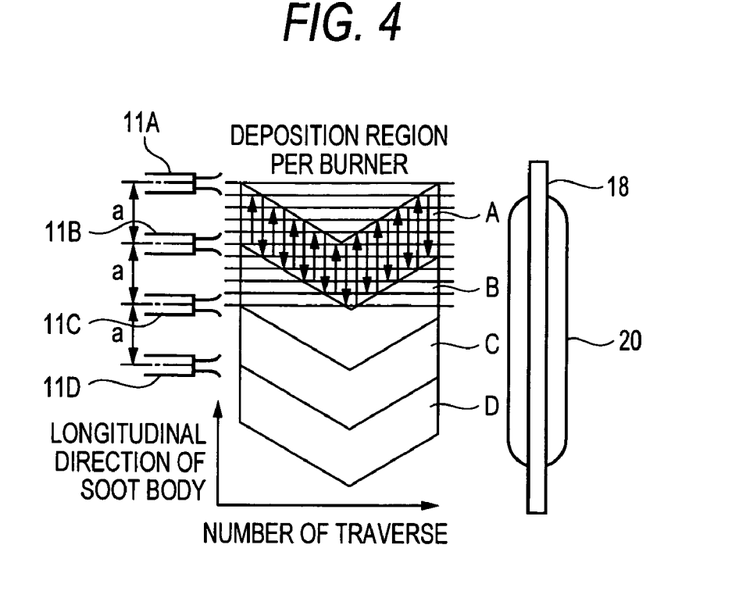
FIG. 4 is a typical view showing a state of a glass particle deposit region per burner in an MMD method.

Incidentally, in the multi-burner multi-layer deposition method, as shown in FIG. 4, a plurality of burners 11 (e.g., four nozzles 11A to 11D) for synthesizing glass particles are disposed opposite to the starting rod 18 rotating. The starting rod 18 and the burner 11 for synthesizing glass particles are relatively reciprocally moved up and down by the nozzle interval. In FIG. 4, the burners 11 are arranged at regular intervals of a. Accordingly, glass particles formed by the burners 11A to 11D respectively are deposited on feather-shaped regions A to D respectively in FIG. 4. Incidentally, the movement of the uppermost burner 11A in the region A is indicated by the arrows.

Here, the turning back position of the reciprocal movement is moved in a predetermined direction little by little, that is, at regular internals of a value almost equal to the value obtained by dividing the interval of the burners 11 by an integer. When the turning back position is moved by the interval of the burners 11, the burners 11 is moved backward. This operation is repeated successively so that glass particles synthesized by the burners 11 are deposited successively on a surface of the starting rod 18. Thus, the glass particle deposit is produced.

Figure 5:
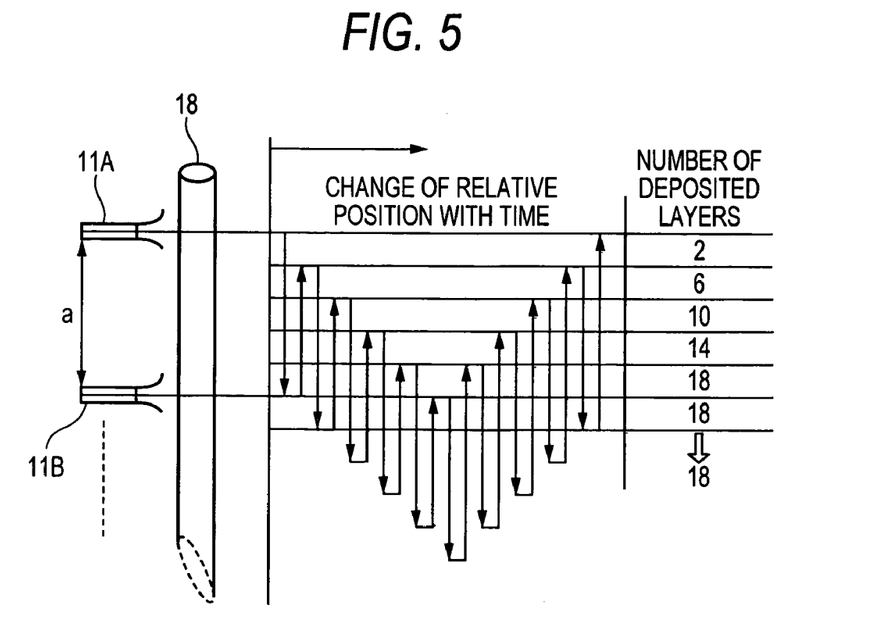
FIG. 5 is an explanatory view showing an example of the state of relative movement of a starting rod and a burner.

FIG. 5 shows the situation of the change in the relative positions of the starting rod 18 and the burner 11 with time in this method. In FIG. 5, the vertical movement of the burner 11A is indicated by the arrows. In FIG. 5, the first outermost burner 11A and the second nozzle 11B are shown as part of rows of the burners 11. The same situation can be applied to the opposite outermost burner 11D and the burner 11C on the inside of the burner 11D. Each of numerical values on the right side of FIG. 5 indicates the number of glass particle deposit layers formed on the starting rod 18 in a series of reciprocal movement until the turning back position is restored to the initial position. Portions below the 18 layers in FIG. 5 have constant 20 layers except the lower end portion because glass particles are deposited by the third burner and burners after the third burner. Theoretically, this system can make the effective portion the longest and can reduce the outer diameter variation of the glass particle deposit.

<Industrial Applicability>

As described above, in the method for producing a glass particle deposit according to the invention, when flame is formed by a burner for synthesizing glass particles to thereby generate glass particles to deposit the glass particles on the outer circumference of a starting rod, the flow rate of clean gas (CG) introduced into a container portion containing the starting rod is limited to be not higher than four times as much as the volume of the apparatus per minute. As a result, the outermost layer of the glass particle deposit can be prevented from being cooled locally, so that bulk density variation in the longitudinal direction of the glass particle deposit, that is, outer diameter variation and breakage can be reduced. Furthermore, when clean gas is introduced from the upper portion and/or the lower portion to the exhaust port provided in the container portion so that the internal pressure gradient of the container portion from the introducing portion to the exhaust port is selected to be in a range of from 5 Pa/m to 150 Pa/m, impurities such as surplus glass particles, etc., floating in the container portion can be reduced from being mixed in the glass particle deposit to cause abnormal points. Furthermore, after the glass particle deposit produced is kept in an isolation chamber filled with CG within 48 hours or kept in a clean gas atmosphere within 24 hours, the glass particle deposit is heated so as to be vitrified. As a result, impurities mixed in the glass particle deposit or deposited on a surface of the glass particle deposit can be reduced to thereby improve the quality of the glass preform.

The invention claimed is:

1. A method of producing a glass particle deposit in a container portion containing a starting rod, comprising:
   performing an outside vapor-phase deposition method to generate glass particles; and
   introducing a flow rate of gas into the container portion during the outside vapor-phase deposition method, wherein
   the flow rate is controlled to be not higher than about four times as much as a volume of the container portion per minute, and
   said gas is introduced from an upper portion and/or a lower portion to an exhaust port provided in the container portion so that the internal pressure gradient of said container portion from a gas introducing portion to said exhaust port is selected to be in a range of from 5 Pa/m to 150 Pa/m.

2. A method of producing a glass particle deposit in a container portion containing a starting rod, comprising:
   performing an outside vapor-phase deposition method to generate glass particles; and introducing a flow rate of gas into the container portion during the outside vapor-phase deposition method, wherein the flow rate is controlled to be not higher than about four times as much as a volume of the container portion per minute, and said gas is introduced from an upper portion and/or a lower portion to an exhaust port provided in the container portion so that the pressure at a gas introducing portion is higher than the external pressure of said container portion by a pressure difference of from zero to 100 Pa.

3. A method of producing a glass particle deposit in a container portion containing a starting rod, comprising:

performing an outside vapor-phase deposition method to generate glass particles; and introducing a flow rate of gas into the container portion during the outside vapor-phase deposition method, wherein the flow rate is controlled to be not higher than about four times as much as a volume of the container portion per minute, and the internal pressure of an exhaust pipe communicating with an exhaust port provided in the container portion is lower than the external pressure of said container portion by a pressure difference of from zero to 29 Pa.

4. A method of producing a glass particle deposit in a container portion containing a starting rod comprising:

performing an outside vapor-phase deposition method to generate glass particles; and introducing gas into the container portion during the outside vapor-phase deposition method, wherein the gas is introduced from an upper portion and/or a lower portion to an exhaust port of the container portion so that an internal pressure gradient of the container portion from a gas introducing portion to the exhaust port is selected to be in a range of from about 60 Pa/m to about 150 Pa/m.

5. The method of producing a glass particle deposit according to claim 4, wherein said gas is introduced from the upper portion and/or the lower portion to said exhaust port so that the pressure at the gas introducing portion is higher than the external pressure of said container portion by a pressure difference of from zero to 100 Pa.

6. The method of producing a glass particle deposit according to claim 4, wherein said gas has such cleanliness that the number of dust particles with a size not smaller than 0.3 μm is not larger than 1000/CF.

7. The method of producing a glass particle deposit according to claim 4, wherein the internal pressure of an exhaust pipe communicating with said exhaust port is lower than the external pressure of said container portion by a pressure difference of from zero to 29 Pa.

8. A method of producing a glass preform by heating a glass particle deposit produced by a producing method according to claim 4 to thereby vitrify said glass particle deposit after keeping said glass particle deposit in an isolation chamber into which gas is introduced, wherein the time required for the keeping is selected to be not longer than 48 hours.

9. The method of producing a glass preform according to claim 8, wherein the internal pressure of said isolation chamber is higher than the external pressure of said isolation chamber.

10. The method of producing a glass preform according to claim 8, wherein said gas has such cleanliness that the number of dust particles with a size not smaller than 0.3 μm is not larger than 1000/cf.

11. A method of producing a glass preform by heating a glass particle deposit produced by a producing method according to claim 4 to thereby vitrify said glass particle deposit after keeping said glass particle deposit in an atmosphere of gas, wherein the time required for the keeping is selected to be not longer than 24 hours.

12. The method of producing a glass preform according to claim 11, wherein said gas has such cleanliness that the number of dust particles with a size not smaller than 0.3 μm is not larger than 10000/CF.

13. A method of producing a glass particle deposit in a container portion containing a starting rod comprising:

performing an outside vapor-phase deposition method to generate glass particles; and introducing gas into the container portion during the outside vapor-phase deposition method, wherein the gas is introduced from an upper portion and/or a lower portion to an exhaust port of the container portion so that an internal pressure gradient of the container portion from a gas introducing portion to the exhaust port is selected to be in a range of from about 5 Pa/m to about 150 Pa/m, and the gas is introduced from the upper portion and/or the lower portion to said exhaust port so that the pressure at the gas introducing portion is higher than the external pressure of said container portion by a pressure difference of from zero to 100 Pa.

14. A method of producing a glass particle deposit in a container portion containing a starting rod comprising:

performing an outside vapor-phase deposition method to generate glass particles; and introducing gas into the container portion during the outside vapor-phase deposition method, wherein the gas is introduced from an upper portion and/or a lower portion to an exhaust port of the container portion so that an internal pressure gradient of the container portion from a gas introducing portion to the exhaust port is selected to be in a range of from about 5 Pa/m to about 150 Pa/m, and the internal pressure of an exhaust pipe communicating with said exhaust port is lower than the external pressure of said container portion by a pressure difference of from zero to 29 Pa.

* * * * *